No. 625,224.  
J. A. WARE.  
FRUIT OR VEGETABLE PRESS.  
(Application filed Nov. 1, 1898.)  
Patented May 16, 1899.
(No Model.)  
2 Sheets—Sheet 1.
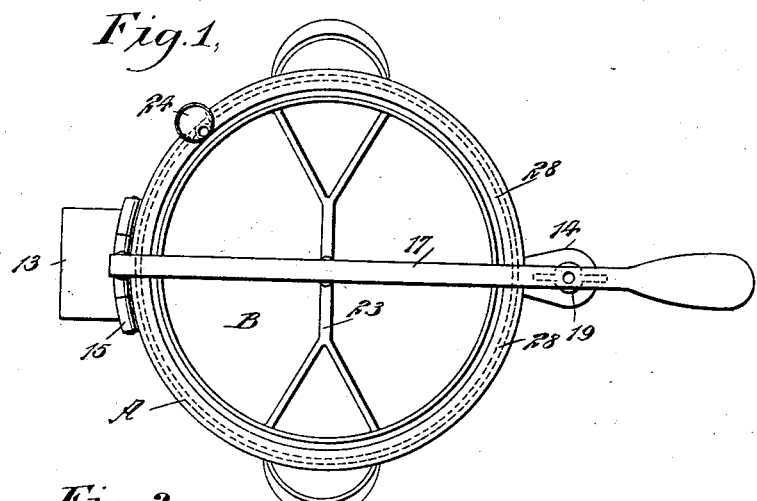
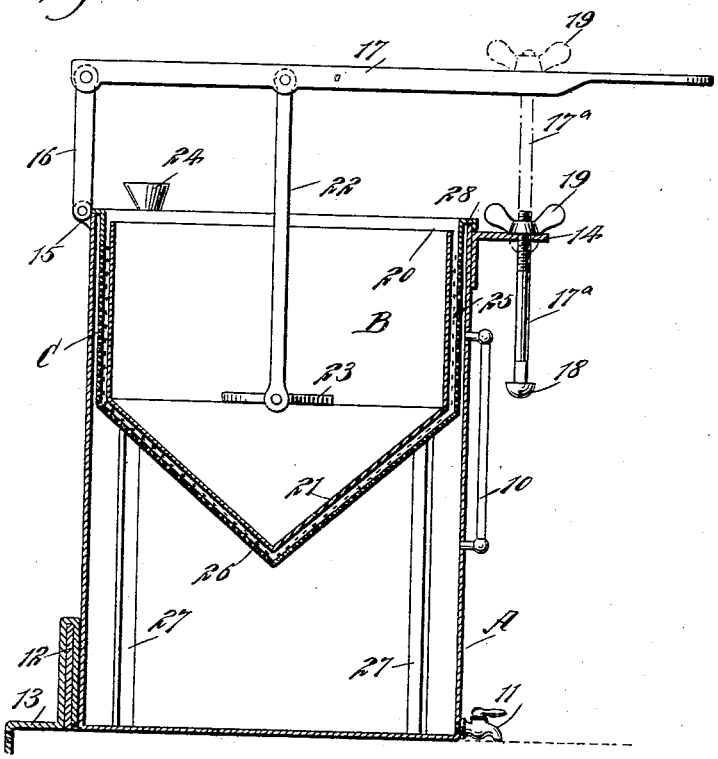
WITNESSES:  
Edw. Thorpe  
INVENTOR  
Julia A. Ware  
BY  
ATTORNEYS.

No. 625,224. Patented May 16, 1899.
J. A. WARE.
FRUIT OR VEGETABLE PRESS.
(Application filed Nov. 1, 1898.)
(No Model.) 2 Sheets—Sheet 2.

WITNESSES:
Edward Thorpe
J. Fred Acker

INVENTOR
Julia A. Ware
BY
Munn
ATTORNEYS.

UNITED STATES PATENT OFFICE.

JULIA A. WARE, OF SALIDA, COLORADO.

FRUIT OR VEGETABLE PRESS.

SPECIFICATION forming part of Letters Patent No. 625,224, dated May 16, 1899.

Application filed November 1, 1898. Serial No. 695,202. (No model.)

*To all whom it may concern:*

Be it known that I, JULIA A. WARE, of Salida, in the county of Chaffee and State of Colorado, have invented a new and Improved Fruit or Vegetable Press, of which the following is a full, clear, and exact description.

The object of my invention is to provide a vessel or receptacle in which fruit or vegetables may be cooked, and to provide means whereby the vessel or receptacle may be utilized as a press or a strainer, the device being particularly adapted for mashing or straining potatoes and other vegetables and in the manufacture of jellies, wines, cider, fruit-butter, and the like.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 3:
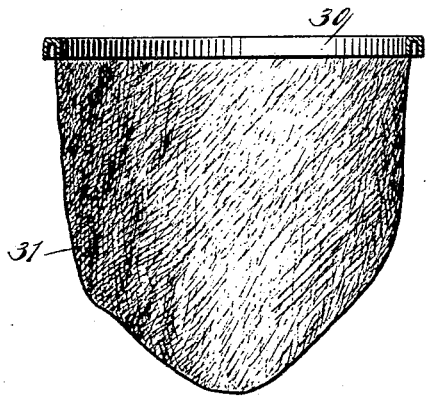
Figure 4:
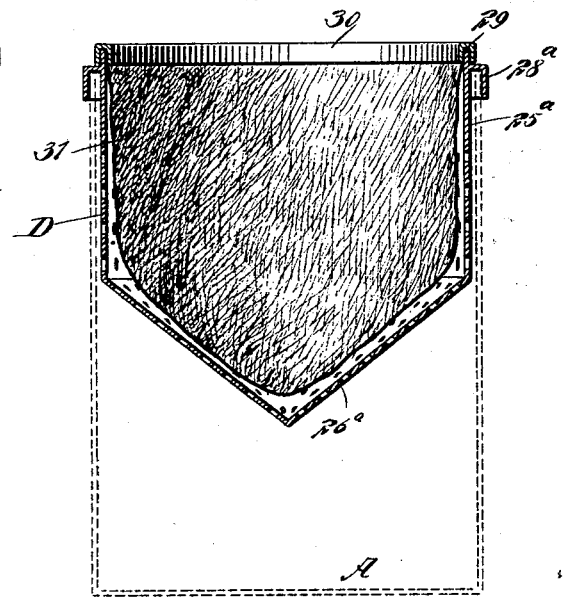
Figure 5:
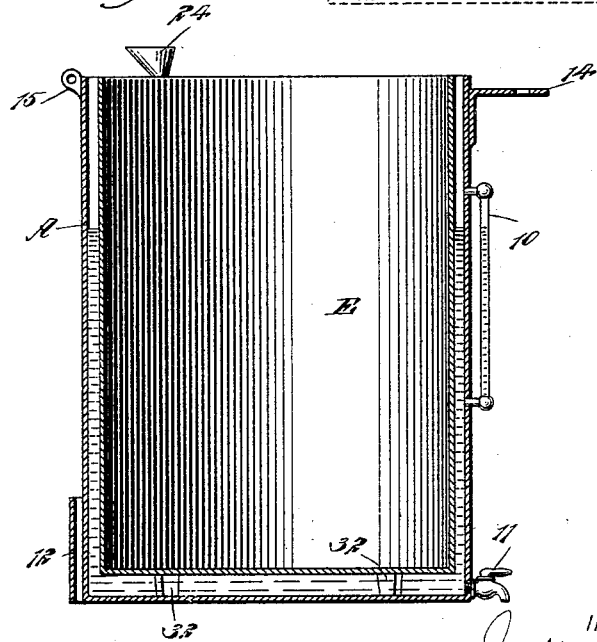

Figure 1 is a plan view of the vessel utilized as a press. Fig. 2 is a longitudinal vertical section through the receptacle when utilized as a press. Fig. 3 is a side elevation of a cloth strainer adapted to be used in connection with the vessel. Fig. 4 is a vertical section through the cloth strainer and a metallic strainer to which said cloth strainer is attached, and Fig. 5 is a longitudinal vertical section through the vessel and an inner vessel adapted to receive articles to be cooked.

A represents a vessel or receptacle which may be made of any desired material and of any size or shape; but preferably the vessel or receptacle A is circular in cross-section. The vessel A is provided with a water-gage 10 and with a faucet 11 at or near the bottom for drawing off the contents of the vessel, and the vessel is further provided, preferably at the side opposite that at which the faucet is located, with a socket 12, the socket being adapted to receive a clamp 13 of any description, whereby the vessel may be firmly held upon a table or other support. The vessel A is also provided at one side near the top with a horizontal arm 14 and at the opposite side near the top with knuckles 15, the knuckles being adapted to pivotally receive an upwardly-extending arm 16, which arm at its upper extremity is pivotally attached to a lever 17, the said lever extending across the top of the vessel at a suitable distance from said top, and it is provided with an opening through which one end of a bolt 17$^a$ may be passed, the bolt being provided at its lower end with a head 18 and at its upper end with a nut 19, and through the medium of the bolt and nut the lever may be pressed downward and held in its adjusted position in a convenient and expeditious manner.

A plunger B is loosely fitted in the vessel A. This plunger is preferably provided with a circular body 20 and a conical bottom 21 and is attached to the central portion of the lever 17 through the medium of a connecting-rod 22, said connecting-rod being attached at its lower end to a spider or cross-bar 23, extending from side to side of the plunger, as shown in both Figs. 1 and 2. The vessel A is also provided with suitable handles and with a funnel 24, attached at the upper edge, by means of which funnel water or other fluid may be readily poured into the vessel when its upper portion is practically closed.

In connection with the plunger B a strainer C is employed when it is desirable to use the device as a press in the manufacture of tomato catsup, sauces, or like articles. This strainer C comprises a cylindrical body 25 and a conical bottom 26, both the body and the bottom being provided with fine perforations, and at the upper end of the strainer C a flange 28 is located, adapted to extend over the upper edge of the vessel A and hold the strainer suspended within said vessel. The strainer is of such size that the plunger B may readily enter it.

The pulp from which the liquid is to be extracted is placed in the strainer C, and the plunger is then introduced into the strainer and forcibly pressed upon the pulp through the medium of the lever 17, operated by hand or by means of the thumb-nut 19 and bolt 17$^a$. The strainer C is usually provided with legs 27, which extend to the bottom of the vessel A, so that all the tension on the strainer will not necessarily be sustained by the upper flange 28, and so that the strainer will stand upright when detached.

When jellies, wine, cider, or the like are to be manufactured, I employ a strainer D, having coarser openings than the strainer C, the strainer D comprising a cylindrical body 25ª and a conical bottom 26ª; but when the strainer D is used the plunger need not be employed and may be dropped to one side or may be entirely disconnected from the body. The coarse strainer D, however, is provided with a downwardly-extending angular flange 28ª upon its outer surface near the top, said flange being adapted to receive the upper edge of the vessel A, as shown in Fig. 4, and the strainer D is further provided with an upwardly-extending flange 29 at its upper edge, this upper flange 29 being intended to receive a ring 30, and the ring 30 is adapted to secure the upper edge of a straining-bag 31 to the upper edge of the coarse strainer D, the bag extending downward within said strainer.

The vessel A may be employed for cooking purposes, as shown in Fig. 5, in which event an inner vessel E is employed, provided with legs 32 at its bottom to support it above the bottom of the main vessel A, or the inner vessel E may be supported in the outer vessel by a suitable flange at the top. When this inner vessel E is employed, water is introduced into the space between the two vessels, as is likewise shown in Fig. 5.

A device constructed as above set forth is exceedingly useful in a household and in the manufacture of fruit jellies, butters, jams, and the like. It is simple, durable, and economic and its operation may be readily understood.

Having thus described my invention, I claim as new and desire to secure by Letters Patent—

1. The combination with a vessel for the treatment of fruits and vegetables, of a strainer, means for supporting the strainer in the vessel, a hollow plunger having movement in said strainer, a cross-bar extending from side to side of the plunger, a rod connected with said cross-bar and a lever connected with said rod, for operating the plunger, substantially as described.

2. The combination with a vessel adapted for the treatment of vegetables and fruits, said vessel being provided at one side with a horizontal arm located at the top of the vessel, a bolt loosely fitted in the said arm and having a head at one end, a nut for the other end of the said bolt, and an upwardly-extending arm pivotally connected with the vessel at the side opposite the horizontal arm, of a lever pivotally attached at one end to the upwardly-extending arm, the said lever being provided near its other end with an opening to receive the said bolt, a plunger, and a connecting-rod uniting the plunger with the said lever, substantially as described.

3. The combination, with a vessel adapted for the treatment of fruits and vegetables, and means for attaching the vessel to a support, of a strainer adapted to be supported within the said vessel, said strainer comprising a body-section conforming to the cross-sectional contour of the said vessel, and a conical bottom, a hollow plunger adapted to fit into the said strainer and conforming to the contour thereof, a lever, an arm pivotally connecting one end of said lever with said vessel, and a connecting-rod uniting said lever with a cross-bar within the said hollow plunger, substantially as described.

4. The combination with a vessel adapted for the treatment of fruits and vegetables and means for attaching the vessel to a support, of a strainer adapted to be supported within the said vessel and having a conical bottom, a plunger adapted to fit into the said strainer and conforming to the contour thereof, a lever, an arm pivotally connecting one end of said lever with said vessel, and a connecting-rod uniting said lever with the said plunger, substantially as described.

JULIA A. WARE.

Witnesses:
R. H. JONES,
J. W. DE WEESE.